(12) United States Patent
Hinkel

(10) Patent No.: US 9,117,320 B2
(45) Date of Patent: Aug. 25, 2015

(54) METHOD FOR TRANSMITTING VIDEO DATA

(75) Inventor: Ralf Hinkel, Hoeringen (DE)

(73) Assignee: MOBOTIX AG, Winnweiler (DE)

( * ) Notice: Subject to any disclaimer, the term of this patent is extended or adjusted under 35 U.S.C. 154(b) by 815 days.

(21) Appl. No.: 13/376,035

(22) PCT Filed: Jun. 2, 2010

(86) PCT No.: PCT/DE2010/000612
§ 371 (c)(1),
(2), (4) Date: Feb. 15, 2012

(87) PCT Pub. No.: WO2010/139306
PCT Pub. Date: Dec. 9, 2010

(65) Prior Publication Data
US 2012/0134640 A1 May 31, 2012

(30) Foreign Application Priority Data
Jun. 5, 2009 (DE) .......................... 10 2009 024 259

(51) Int. Cl.
| | |
|---|---|
| *H04N 7/18* | (2006.01) |
| *G07C 5/00* | (2006.01) |
| *G07C 5/08* | (2006.01) |
| *G08B 13/196* | (2006.01) |

(52) U.S. Cl.
CPC .............. *G07C 5/008* (2013.01); *G07C 5/0866* (2013.01); *G07C 5/0891* (2013.01); *G08B 13/19647* (2013.01); *G08B 13/19669* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 2003/0080878 | A1 | 5/2003 | Kirmuss |
| 2007/0150138 | A1 | 6/2007 | Plante |
| 2007/0217761 | A1 | 9/2007 | Chen et al. |
| 2009/0195651 | A1* | 8/2009 | Leonard et al. ............... 348/148 |
| 2009/0222163 | A1 | 9/2009 | Plante |
| 2011/0105030 | A1* | 5/2011 | Matsuo et al. ............... 455/41.2 |
| 2012/0087499 | A1* | 4/2012 | Harris ........................... 380/210 |
| 2014/0114555 | A1* | 4/2014 | Lagassey ...................... 701/117 |

FOREIGN PATENT DOCUMENTS

| | | |
|---|---|---|
| DE | 101 11 421 | 9/2002 |
| DE | 699 20 290 | 9/2005 |
| WO | 2004 036926 | 4/2004 |
| WO | 2007 067775 | 6/2007 |

(Continued)

OTHER PUBLICATIONS

International Search Report Issued Oct. 27, 2010 in PCT/DE10/000612 Filed Jun. 2, 2010.

(Continued)

*Primary Examiner* — William C Vaughn, Jr.
*Assistant Examiner* — Eileen Adams
(74) *Attorney, Agent, or Firm* — Oblon, McClelland, Maier & Neustadt, L.L.P.

(57) ABSTRACT

A video transmission method in which temporarily recorded video data are partially transmitted to a video data backup unit. In this case event-based identification data are concomitantly recorded during the temporary recording and only video data identified by identification data are transmitted to the video data backup unit.

20 Claims, 1 Drawing Sheet

(56) References Cited

FOREIGN PATENT DOCUMENTS

| | | |
|---|---|---|
| WO | 2007 133989 | 11/2007 |
| WO | 2008 058293 | 5/2008 |

OTHER PUBLICATIONS

German Office Action Issued Apr. 28, 2010 in German Patent Application No. 10 2009 024 259.7 Filed Jun. 5, 2009.

* cited by examiner

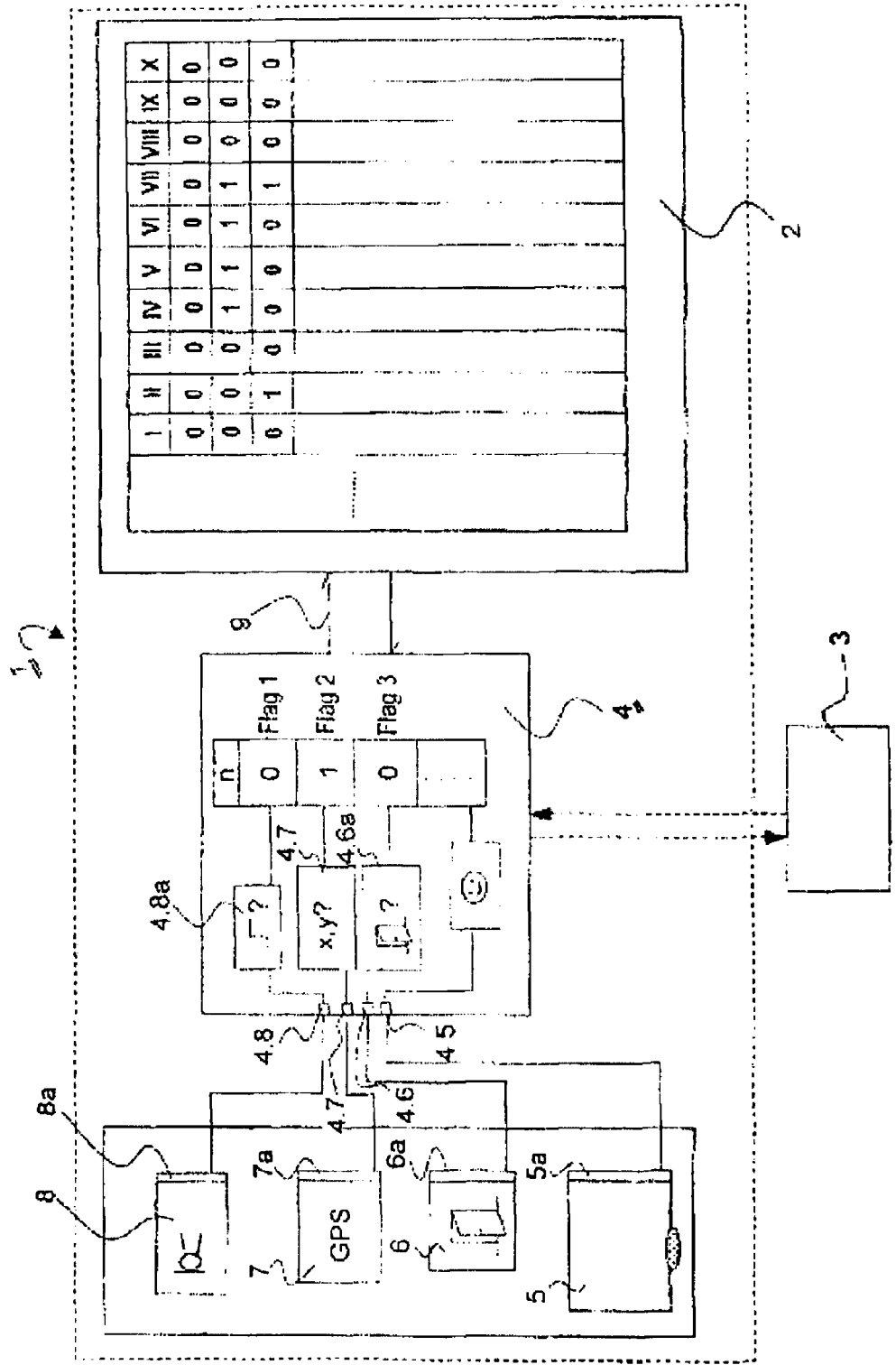

METHOD FOR TRANSMITTING VIDEO DATA

The present invention relates to what is claimed in the preamble and accordingly relates to the transmission of video data.

The surveillance of specific regions using video cameras is increasingly gaining in importance because, firstly, the quality of the image data recorded using cameras is increasing, such that the meaningfulness of the images is increasing and, secondly, there is an increasing security requirement or acquisition of video data is even prescribed in some instances. In this case, it has already become common for video data firstly to be buffer-stored temporarily at the location of recording. The buffer-stored data then have to be transmitted at a given time in order to be able to archive them permanently or at least for a relatively long period of time.

While the actual storage is readily possible on account of the data memories that are less and less expensive to procure, problems exist to the effect that the data also have to be transmitted in the simplest possible manner. This constitutes a considerable problem particularly when data from a multiplicity of recording units have to be backed up in the shortest possible time. This is the case particularly when recording takes place in a mobile unit such as a bus and the temporary memory of said unit is intended to be read at specific locations, such as a bus station, to be precise in a limited time. Similar problems also arise, for instance, in the case of railroad connections if data from trains are intended to be backed up during the stop at railroad stations.

It is desirable to be able to back up video data even when the data channels available for data backup have a greatly limited bandwidth or are available only temporarily.

It is already known to compress video data prior to recording or transmission.

The object of the present invention consists in providing something novel for industrial application.

This object is achieved in the manner claimed in independent form.

According to a first aspect of the present invention, therefore, a video data transmission method is proposed, wherein temporarily recorded video data are partially transmitted to a video data backup unit, wherein event-based identification data are concomitantly recorded during the temporary recording and only video data identified by identification data are transmitted to the video data backup unit.

The term video data here denotes image sequences having a fixed or varying image refresh frequency, in particular, but not mandatorily, having an image refresh frequency sufficient for representing image sequences having a continuous effect, and with or without sound; in the case of sound recording, a sound track can likewise be (concomitantly) identified.

The invention therefore makes use of the insight that, for the majority of recorded data, in general as early as during recording it is possible to forecast which parts of a recording will have particular significance. In this case, the temporary recording of all the video data at the same time ensures that if necessary regardless of a forecast—which possibly proves not to be completely correct in an individual case—nevertheless all the video data are available after a specific time. This achieves an error tolerance which firstly enables high security against data gaps and secondly enables very fast transmission of recorded video data.

The video data transmission method of the present invention is particularly advantageous in mobile units such as buses, which acquire data over a long period of time without particular incidents being expected, and which communicate with the control center only infrequently; in this case, although it is possible, in principle, to establish communication between a control center and a recording device remote from the control center via public networks such as the GSM or UMTS network, the costs to be incurred for this are typically prohibitive particularly in the case of large volumes of data to be transmitted.

It is therefore preferred if the communication is effected in bus stations or similar locations where communication via WLAN or the like is possible. Moreover, in this regard, reference should be made to the property right WO 2009/039818 A2.

However, it is also possible to provide, instead of or in addition to wireless transmission, a backup on a mobile storage medium, such as a USB stick or an exchangeable memory card, or to use such a medium for this purpose. In such a case, the recorded data are typically transmitted from the temporary memory in the camera to the exchangeable (buffer-) storage medium, provided that they are intended for this purpose in accordance with identification. The identification of the data here allows the volume of data that are to be recorded to be significantly reduced and, moreover, the transmission times thus to be shortened. The fact that data already backed up or data archived in accordance with identification are preferably firstly also held in the memory of a camera should be mentioned.

In one particularly preferred variant of the invention, the video data are identified for later backup if the device is situated at a specific location, which can be detected by means of GPS signals, for example; alternatively and/or additionally it can be demanded that an identification be effected if the ambient loudness deviates from an expected standard value, which may be the case firstly if, for instance in buses or the like, the ambient loudness increases to an excessively great extent, or else if, for instance in machine halls or the like, a decrease in the ambient loudness indicates defects; furthermore, alternatively and/or additionally, in particular in the case of means of transport, an identification of video data for later archiving can be effected depending on a door opening, for example a passenger entrance door opening, and/or it can be provided that video data are provided for the identification upon actuation of a panic button and/or non-actuation of a dead man's button. The fact that moreover, in particular GPS data are preferably concomitantly recorded should be mentioned.

The combination of a plurality of criteria for generating the identification which brings about an automatic archiving or transmission should be mentioned as preferred. This combination can have recourse to Boolean operators, to fuzzy logic, etc. Such a combination can be performed either during the video data recording or, e.g. depending on transmission channel bandwidth or the like, during a transmission phase.

It is furthermore possible also to identify video data remotely for a later backup. This can be particularly expedient in public buildings, in which case overwriting of data which are recorded for instance during an emergency situation can at the same time preferably be prevented.

Furthermore, it should be pointed out that a video data identification can also be prevented under specific conditions. Thus, for instance in the case of relatively large industrial areas, a video data recording can preferably be prevented where a works bus travels past an area which is closed off per se and images of which are accordingly also intended to be made accessible only to a restricted group of people.

It should be pointed out that it is particularly preferred not only to transmit those video data which themselves are identified on account of events detected during their recording, but furthermore in particular also to provide data concomitantly for transmission shortly before or after a phase recognized as particularly important. For this purpose, either a recording already effected can be modified by altering the identification data, for example an identification flag; this can take place before the actual transmission. Alternatively and/or additionally, it can be ensured during transmission that, if appropriate, data are concomitantly transmitted before and/or after an identification. This is advantageous, for instance, where a compression is effected in such a way that, for representing complete images, transmission of image data that arose a relatively long time ago is necessary, for instance because irrelevant image regions are recorded only infrequently. This allows the use of the invention with a plurality of compression methods. Attention shall be drawn, in particular, to the MxPEG compression in the present invention as a preferred embodiment.

Moreover, in one preferred variant, it can be provided that the volume of video data before or after the triggering of an identification which is to be concomitantly transmitted regardless of an event not detected during their recording is dependent on the reason for the data identification. It is particularly preferred, therefore, if the reason for identification or marking is concomitantly acquired. It is then possible to ensure that, if appropriate, acquired data are concomitantly transmitted in a sufficient volume, for instance before the actuation of a panic button, because a situation typically escalates prior to the actuation thereof, while a shorter period of time is chosen in the case of the opening or closing of entrance doors of a bus.

It is also therefore particularly preferred if earlier video data are subsequently modified for a later transmission in response to an identification of current video data that is effected after the recording of the earlier data. In order to ensure this in terms of hardware, possibilities are preferably provided to the effect that, in real time, that is to say during an ongoing recording, video data recorded earlier are read in once again from the temporary memory and are modified. For this purpose, the internal memory requires a sufficiently fast link to a camera processor and the latter requires a sufficient processor power.

Protection is also claimed for a camera arrangement of the present invention.

The invention is described below merely by way of example with reference to the drawing, which illustrates by means of FIG. 1 an arrangement according to the present invention.

According to FIG. 1, an arrangement 1 designated generally by 1, for performing a video transmission method, wherein video data recorded temporarily in a memory 2 are partially transmitted to a conventional video data backup unit 3 not necessarily belonging to the arrangement of the invention, wherein event-based identification data are concomitantly recorded during the temporary recording and only video data identified by identification data are transmitted to the video data backup unit 3, comprises, alongside the memory 2, a central data processing unit 4, into which input data from an image sensor 5, a door opening status signal transmitter 6, a GPS receiver 7 and a microphone 8 are fed at inputs 4.5, 4.6, 4.7 and 4.8. The central data processing unit 4 communicates with the memory 2, configured here as a dual-port memory, via a data bus 9 and with the video data backup unit 3 via a conventional WLAN interface.

The unit 1 forms a digital video camera for recording high-resolution images 1, here in a mobile drivable system, which is described by way of example as a bus.

The storage capacity of the memory 2 suffices here to store the video data from a week; in this case, in the example here, it should be assumed at the same time that daily archiving of the video data determined for this purpose by identification is effected. The storage capacity of the memory 2 thus suffices in the exemplary embodiment discussed as preferred to store significantly more video data than arise between two archiving times.

The video data backup unit 3 external to the camera serves as a long-term archive for video data. It should be pointed out that, as usual in the prior art, cyclic overwriting of the memory areas provided in the video data backup unit 3 is possible. Preferably, the video data backup unit 3 is designed to store all data at least as long as they are also held available in the temporary memory 2 of the video camera.

In the present case, the central data processing unit 4 is formed as a program-controlled microprocessor having a multiplicity of input/output interfaces, in the present case in particular the interfaces 4.5 to 4.8, wherein in this respect, if appropriate, the signals can be conditioned in the units 5 to 8, indicated by conditioning stages 5a to 8a at the units 5 to 8. The conditioning is effected such that, at the interfaces 4.5 to 4.8, a digital signal is respectively provided which is representative of the video data, the door opening status detected by sensor 6, the GPS position determined by means of the GPS system 7, and the noise level detected by means of the microphone 8. In this case, conventional data formats known per se in the prior art can readily be used.

The central data processing unit 4 is now designed to provide the data stream of the video data obtained from the image sensor 5 at the input 4.5 with an identification dependent on the signals obtained at the inputs 4.6 to 4.8. For this purpose, in the case of those obtained at input 4.8, for the sound signals picked up by means of the microphone 8, it is determined whether the signal is representative of an excessive loudness. If a specific threshold value is exceeded, indicated at 4.8a, a marker, flag 1, is set to 1; otherwise no marking is set.

The signals obtained by means of the GPS sensor 7 and the current position, represented as x, y in FIG. 1, cf. reference numeral 4.7a, are compared with previously stored positions by the central data processing unit 4. For this purpose, the central data processing unit can have an internal memory for such comparison positions (not shown) and/or communicate with an external data memory in a suitable manner. If a current position, as detected by the GPS sensor 7, corresponds to a previously stored position known as critical, or region identified as critical, a flag 2 is set to 1; otherwise this flag acquires the value 0.

The central data processing unit 4 furthermore obtains information about whether a door of the bus monitored by means of the camera in the interior is opened for passengers to enter or exit. If the door is open, a marking, flag 3, is set to 1; otherwise it acquires the value 0.

It goes without saying that, for generating a door opening signal, suitable contacts can be provided on the door and/or a door opening request can be generated by a button to be actuated by the driver and/or a passenger; therefore, there are a large number of different possibilities of realization for sensor 6.

The central data processing unit 4 is then designed to provide the video data 5, if appropriate after compression, with a header, in which firstly the recording time t, represented in FIG. 1 as a sequential number I to X, and secondly flags 1 to 3 are coded and which is written to the memory 2 with the video data via the interface 9. It is possible to record further data, e.g. the GPS position during recording, etc.

The central data processing unit 4 has a data processing capacity that suffices to receive data simultaneously at the inputs 4.5 to 4.8, to perform the described assessment of the signals received at the inputs 4.6 to 4.8, to generate the header, to store all the video data with the header characterizing them at the memory 2 via the interface 9, to read out data from the memory 2 upon request via a radio link 10 from a video archive, to ascertain on the basis of the header read out whether at least one of the markings is set, that is to say to ascertain whether at least one of the flags 1 to 3 has the value 1 for a specific video datum, and, if this is the case, to provide the video data thus identified for a transmission via the WLAN link 10 to the archiving unit 3.

The way in which the arrangement is used will be described below on the basis of an example in which the bus in which the camera 1 is arranged travels along a known line route.

Firstly, video data are recorded, without the bus traveling through a region known as critical, a passenger entering or exiting, and without excessive noise occurring inside the bus, cf. the flags under I.

Subsequently, a passenger enters or exits, cf. II. The corresponding video data are accordingly identified. The bus then travels further, without special incidents occurring, cf. III. The bus then travels through a line section which, for instance because it is situated in social trouble spots, is known as critical, cf. IV. The corresponding data are identified and thereby provided later automatically for a transmission, as long as the bandwidths available upon archiving are sufficient; in the case of greatly limited bandwidths, the video data IV and V and also VI are not yet transmitted; the evaluation of the identification can thus be performed in a manner dependent on bandwidth. At the time VII, the door is then opened at a critical line section, which leads to an identification by the setting of the flag 3, such that the corresponding video data are provided later for the transmission and are archived.

The remaining video data are recorded without particular events and, accordingly, do not have to be transmitted.

The method described makes it possible to perform archiving of images of the bus interior which are acquired in critical sections. Moreover, all passengers entering and exiting are archived without any problems. In general, this already ensures that the surveillance data can be evaluated centrally, damages to the bus fittings resulting from vandalism are typically caused in critical areas and with increased loudness. The corresponding image data are likewise transmitted automatically. In general, it can thus readily be determined when and where a person who disrupted the operation of the bus entered the bus. By contrast, if a situation is present in which damage was caused by vandalism, without the corresponding video data having been recorded, it is still possible subsequently to search the temporary memory as a result of the relatively long storage of the data.

It can thus be ensured that, firstly, surveillance data that are actually required are archived with high probability, but that, secondly, this not, however, being absolutely necessary but indeed being preferred, even in the case where the expected indications of critical situations were not sufficient, enough video data are still available and, if appropriate, can still be transmitted upon separate request.

It should be pointed out that the video data can be recorded in the form of images that succeed one another in rapid succession and, if appropriate, cannot be reproduced fluidly, different resolutions are possible for different regions, a continuous recording of a sound track is possible, but the sound track recording is not absolutely necessary, and that, moreover, the sensors used here by way of example are not restrictive.

The invention claimed is:

1. A transmission method for video data acquired in a mobile unit over a long time and communicated to a control center only infrequently via data channels having a limited bandwidth, the method comprising:
    partially transmitting temporarily recorded video data to a video data backup unit; and
    concomitantly recording event-based identification data during the temporary recording and transmitting only video data identified by identification data to the video data backup unit,
    wherein all video data is stored temporarily in a memory sufficient to store more video data than arise between two archiving times,
    identification data used to identify video data for backup is provided at time of recording or at a later stage,
    an evaluation of the identification is effected in a bandwidth-dependent manner, and
    data identified is transmitted while data not transmitted is maintained in the temporary storage.

2. A transmission method according to claim 1, wherein identification data indicating a backup requirement are generated in response to the actuation of a button.

3. The video data transmission method as claimed in claim 1, wherein the video data are recorded in a bus or train.

4. The video data transmission method as claimed in claim 3, wherein the video data are transmitted by radio, preferably via a WLAN connection and/or a GSM or UMTS network.

5. The video data transmission method as claimed in claim 4, wherein a plurality of different triggers are provided for a data identification indicating the video data backup necessity and a differentiation between different triggering reasons is made by the identification.

6. The video data transmission method as claimed in claim 4, wherein a video data recording can be activated remotely by at least security forces in a police control center.

7. The video data transmission method as claimed in claim 4, wherein a video data identification can be deactivated.

8. The video data transmission method as claimed in claim 4, wherein upon identification of video data for the transmission, video data recorded shortly before and shortly after the beginning of an identification are also concomitantly transmitted, in particular in order to ensure complete image contents upon video data compression.

9. The video data transmission method as claimed in claim 8, wherein the volume of video data acquired shortly before or shortly after a transmission identification is determined depending on the identification reason.

10. A video data transmission method according to claim 1, wherein video data with identification data indicating a backup requirement are recorded in response to a recording location, in particular a location determined by GPS signals, an ambient loudness, a door opening status and/or a panic or dead man's button actuation.

11. The video data transmission method as claimed in claim 1, wherein the video data backup unit is arranged in a control center that communicates with a plurality of units that record video data, the control center being included in at least a bus station.

12. The video data transmission method as claimed in claim 1, wherein the video data are stored or buffer-stored for backup on a USB stick.

13. A video camera for performing a method as claimed in claim 1 comprising a temporary memory, an input for identification signals and an output for identified video data, wherein provision is made of a selection stage for the recognition of a video data identification of stored data and the selection of identified video data for the transmission.

14. A transmission method for video data acquired in a bus over a long time and communicated to a control center only infrequently, namely on a daily basis via data channels having a limited bandwidth, the method comprising:
   partially transmitting temporarily recorded video data to a video data backup unit; and
   concomitantly recording event-based identification data during the temporary recording and transmitting only video data identified by identification data to the video data backup unit,
   wherein all video data is stored temporarily in a memory sufficient to store video data for a week and thus sufficient to store more video data than arise between two archiving times,
   part of the identification data used to identify video data for backup is provided at time of recording while another part of the identification data is provided after the recording of the video data identified at a later stage,
   an evaluation of the identification is effected in a bandwidth-dependent manner, and
   data identified is transmitted while data not transmitted is maintained in the temporary storage.

15. The video data transmission method as claimed in claim 14, wherein the video data are transmitted a WLAN connection.

16. The video data transmission method as claimed in claim 15, wherein a plurality of different triggers are provided for a data identification indicating the video data backup necessity and a differentiation between different triggering reasons is made by the identification.

17. The video data transmission method as claimed in claim 15, wherein the identification data provided at a later stage after the recording of the video data identified is provided by modifying a recording already effected in response to an identification of current video data.

18. The video data transmission method as claimed in claim 17, wherein upon identification of video data for the transmission, video data recorded shortly before and shortly after the beginning of an identification are also concomitantly transmitted, in particular in order to ensure complete image contents upon video data compression.

19. The video data transmission method as claimed in claim 17, wherein the volume of video data acquired shortly before or shortly after a transmission identification is determined depending on the identification reason.

20. A video camera for performing a method as claimed in claim 14 comprising a temporary memory, an input for identification signals and an output for identified video data, wherein provision is made of a selection stage for the recognition of a video data identification of stored data and the selection of identified video data for the transmission.

* * * * *